(12) United States Patent
Takahashi et al.

(10) Patent No.: US 10,046,634 B2
(45) Date of Patent: Aug. 14, 2018

(54) ENGINE MOUNT STRUCTURE

(71) Applicant: Honda Motor Co., Ltd., Tokyo (JP)

(72) Inventors: Toshiya Takahashi, Saitama (JP);
Yasunori Kobayashi, Saitama (JP);
Takaaki Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/460,212

(22) Filed: Mar. 15, 2017

(65) Prior Publication Data

US 2017/0267091 A1  Sep. 21, 2017

(30) Foreign Application Priority Data

Mar. 16, 2016 (JP) ................. 2016-052219

(51) Int. Cl.
*B60K 5/12* (2006.01)
*B62D 21/11* (2006.01)

(52) U.S. Cl.
CPC ............ *B60K 5/1208* (2013.01); *B62D 21/11* (2013.01)

(58) Field of Classification Search
CPC ...... B60K 5/12; B60K 5/1208; B60K 5/1216; B62D 25/082; B62D 21/11; B62D 21/155
See application file for complete search history.

(56) References Cited

U.S. PATENT DOCUMENTS

| | | | | |
|---|---|---|---|---|
| 6,406,010 B1* | 6/2002 | Yano | ............. | F16F 13/106 267/140.13 |
| 6,460,822 B1* | 10/2002 | Lee | ............. | B60K 5/1208 248/635 |
| 7,520,514 B2* | 4/2009 | Ogawa | ............. | B60G 3/20 180/312 |
| 9,610,979 B2* | 4/2017 | Hirano | ............. | B62D 21/11 |
| 2001/0026038 A1* | 10/2001 | Muramatsu | ............. | F16F 13/268 267/140.11 |
| 2002/0101013 A1* | 8/2002 | Kato | ............. | F16F 1/38 267/140.11 |
| 2002/0166711 A1* | 11/2002 | Witherspoon | ............. | B60N 2/002 180/282 |
| 2006/0255232 A1* | 11/2006 | Hishinuma | ............. | B60G 15/068 248/550 |
| 2006/0284449 A1* | 12/2006 | Miyahara | ............. | B62D 21/11 296/204 |

(Continued)

FOREIGN PATENT DOCUMENTS

| | | |
|---|---|---|
| JP | 2013-072534 | 4/2013 |
| WO | 2011013554 | 2/2011 |

OTHER PUBLICATIONS

"Office Action of Japan Counterpart Application," with machine English thereof, dated Oct. 24, 2017, p. 1-p.7.

*Primary Examiner* — Brian L Swenson
(74) *Attorney, Agent, or Firm* — JCIPRNET

(57) ABSTRACT

An engine mount structure capable of efficiently absorbing vibration input from an engine is provided. The engine mount structure includes a front mount device 20 which is connected to an engine 1 and a subframe 10 to suppress vibration transmission from the engine 1 side to the subframe 10 side. A dynamic damper 26 connected to the subframe 10 to suppress vibration of the subframe 10 is disposed in a hole portion 11b, and an opening of the hole portion 11b is formed in an upper surface portion 11a of a front subframe member component 11 located on a lower side of the front mount device 20.

6 Claims, 8 Drawing Sheets

(56) References Cited

U.S. PATENT DOCUMENTS

| | | | | |
|---|---|---|---|---|
| 2012/0118660 A1* | 5/2012 | Tamura | ............... | F16F 13/103 180/312 |
| 2012/0267184 A1* | 10/2012 | Joly | ................. | F16F 1/373 180/291 |
| 2014/0151528 A1* | 6/2014 | Park | ................. | F16F 3/093 248/634 |
| 2016/0003322 A1* | 1/2016 | Bradshaw | ............ | F16F 13/16 267/140.13 |

* cited by examiner

ENGINE MOUNT STRUCTURE

CROSS-REFERENCE TO RELATED APPLICATION

This application claims the priority benefit of Japan application serial no. 2016-052219, filed on Mar. 16, 2016. The entirety of the above-mentioned patent application is hereby incorporated by reference herein and made a part of this specification.

BACKGROUND OF THE INVENTION

1. Field of the Invention

The present invention relates to an engine mount structure.

2. Description of Related Art

As the existing engine mount structure, an engine mount structure provided with an engine mount is known, and the engine mount mounts an engine to a vehicle body. A mass member may be detachably mounted to an upper surface side of the engine mount, so as to adjust a resonant frequency (e.g., refer to Patent Document 1 or the like).

DOCUMENT OF THE PRIOR ART

Patent Document

Patent Document 1: Japanese Patent Gazette No. 2013-72534

SUMMARY OF THE INVENTION

Problem to Be Solved in the Invention

However, for example, if an active dynamic damper is disposed in a position relatively deviating from the engine mount, such as an upper surface of a subframe, there is a distance from an input point of vibration of the engine to the active dynamic damper, and it is likely that a sufficient antivibration effect cannot be produced.

The present invention is directed to an engine mount structure capable of efficiently absorbing vibration input from an engine.

Technical Means of Solving the Problem

The present invention includes an engine mount structure, including a mount device, the mount device being connected to an engine and a subframe to suppress vibration transmission from the engine side to the subframe side, wherein a dynamic damper connected to the subframe to suppress vibration of the subframe is disposed on a lower side of the mount device.

According to the structure, the dynamic damper disposed on the lower side of the mount device is located on an input point of vibration of the engine. Therefore, the dynamic damper has good vibration absorption efficiency.

In addition, the subframe includes a hole portion, and the mount device is connected to the subframe in a manner of being located on an upper side of the hole portion. The dynamic damper is inserted to the hole portion.

According to the structure, the dynamic damper that can be inserted to the hole portion is identical with an input point of vibration directly below the mount device.

In addition, the hole portion is disposed on an upper surface portion of the subframe, the dynamic damper includes a first installation member and a housing, the first installation member is connected to the upper surface portion, and the housing is inserted to the hole portion.

According to the structure, the first installation member of the dynamic damper is connected to the upper surface portion of the subframe.

Therefore, the dynamic damper can efficiently absorb vibration of the subframe.

In addition, the subframe includes a lowersurface portion in a position opposite the upper surface portion, and the housing is spaced apart from the lower surface portion.

Therefore, movement of the housing for suppressing vibration may not be hindered.

In addition, a connecting position between the subframe and the mount device is set in a position farther away from the dynamic damper than a connecting position between the subframe and the dynamic damper.

Therefore, vibration can be spread efficiently.

Moreover, the subframe and the mount device are elastically connected via a rubber bush, and the subframe and the dynamic damper are fastened rigidly.

Therefore, vibration input from the engine applied to the mount device is absorbed by a rubber bush, and vibration of the subframe may be directly transferred to the dynamic damper, so that attenuate efficiency of the vibration can be improved.

Then, elastic deformation directions of the mount device and the dynamic damper are identical in a vertical direction.

Therefore, vibration of the engine applied to the vertical direction of the mount device is efficiently absorbed by the dynamic damper.

Effect of the Invention

According to the present invention, an engine mount structure capable of efficiently absorbing vibration input from the engine is provided.

DESCRIPTION OF THE EMBODIMENTS

An embodiment of the present invention is described below with reference to the accompanying drawings.

[General Structure of an Engine Mount]

Figure 1:
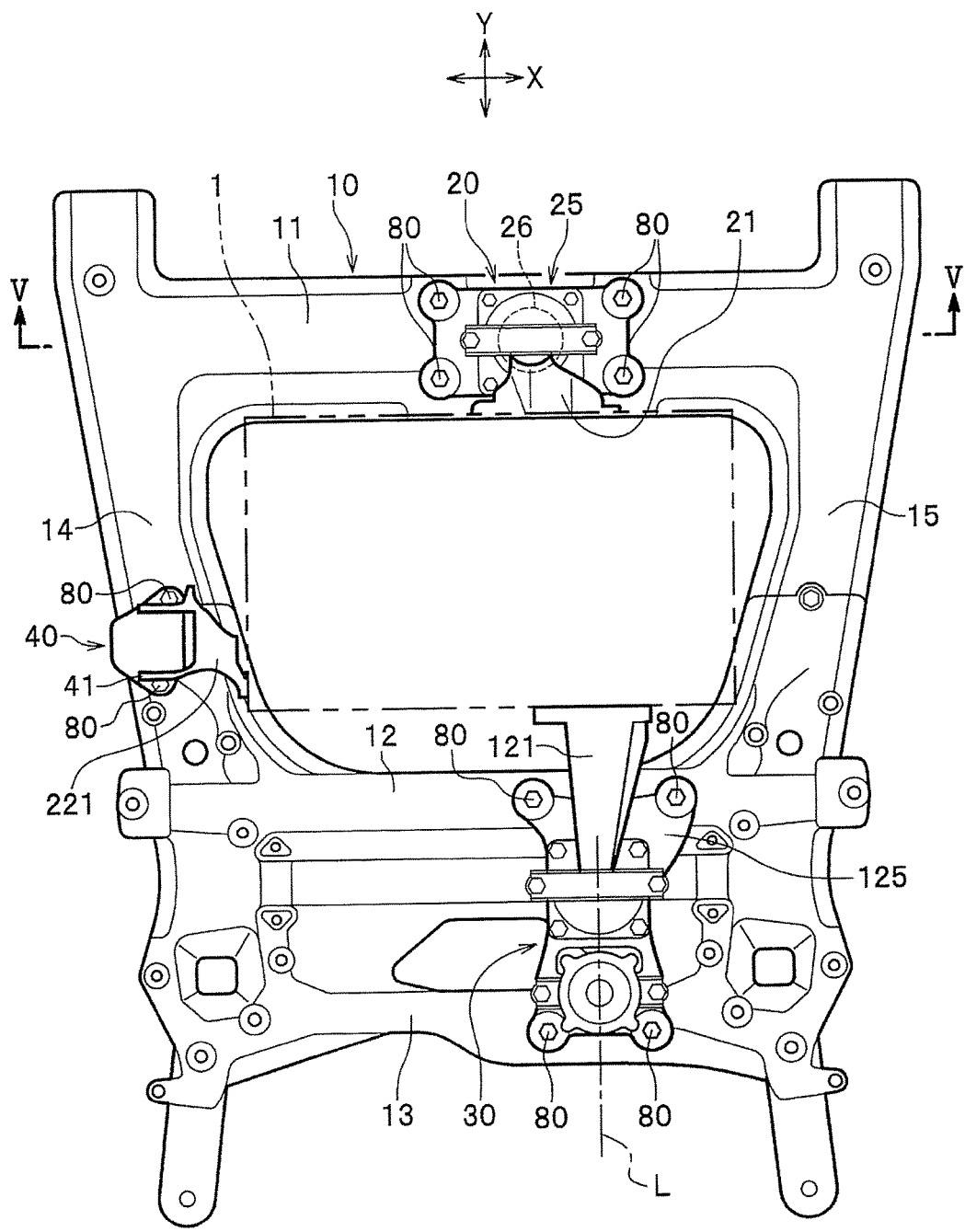
FIG. 1 is a top view of a subframe, which indicates an overall profile, of an engine mount structure according to an embodiment of the present invention.
Figure 2:
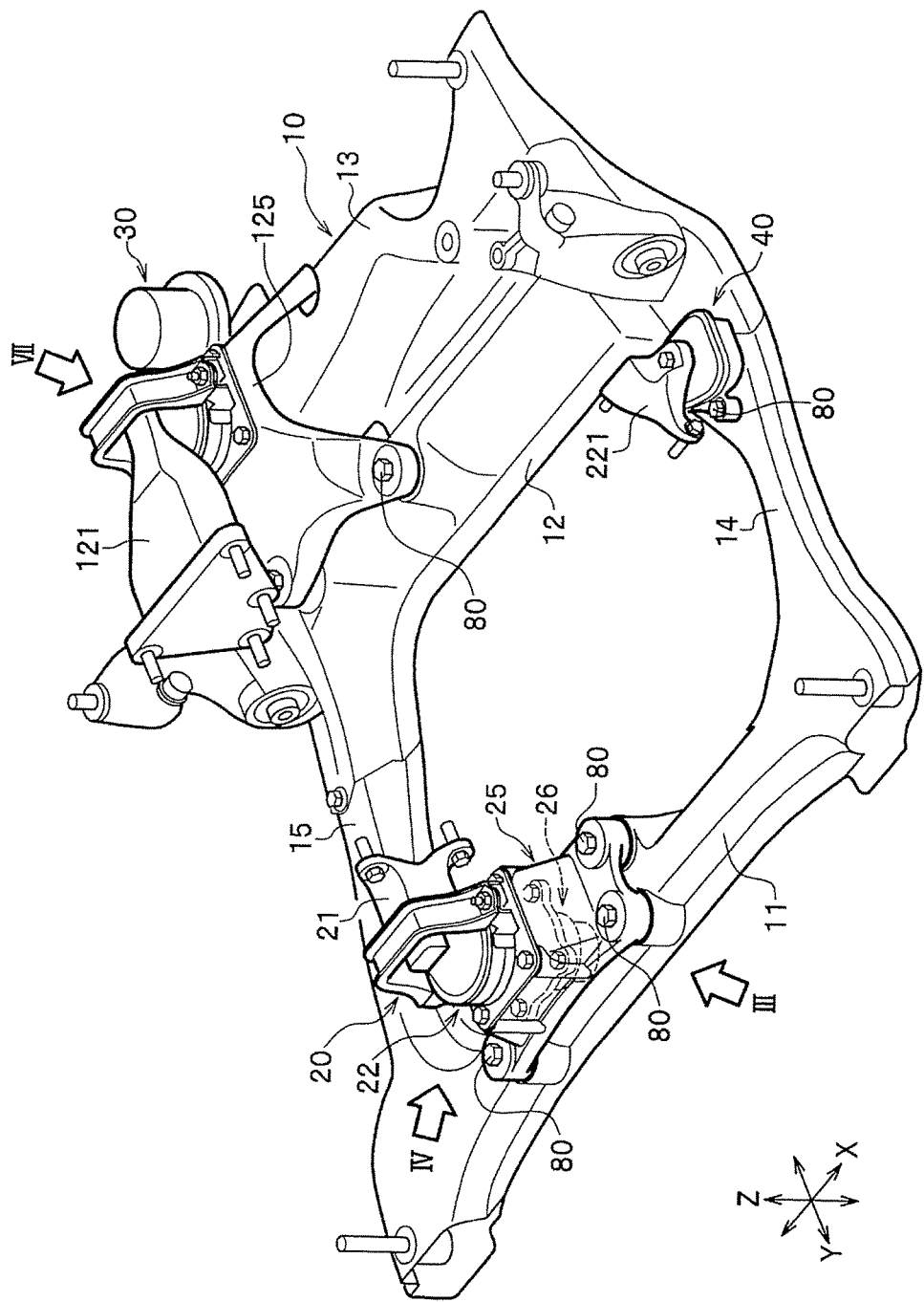
FIG. 2 is a three-dimensional diagram of a subframe, which indicates an overall profile, of the engine mount structure according to the embodiment of the present invention.

FIG. 1 is a top view of a subframe, which indicates an overall profile, of an engine mount structure according to the embodiment. In addition, FIG. 2 is a three-dimensional diagram of a subframe, which indicates an overall profile, of the engine mount structure according to the embodiment.

In the engine mount structure according to the embodiment, a vehicle body frame as a backbone member in an engine room is disposed. As shown in FIG. 1, a subframe 10 supporting an engine 1 is mounted on the vehicle body frame.

The subframe 10 includes a front subframe member component 11, a rear first member component 12, a rear second member component 13, a pair of left and right subframe member components 14 in a vehicle width direction, and a subframe member component 15.

Moreover, the front subframe member component 11, the rear first member component 12, and the rear second member component 13 are integrally connected to the subframe member components 14 and the subframe member component 15 spaced apart from each other along a longitudinal direction in a vehicle front-back direction Y. thus, the subframe 10 is formed substantially in a shape of a well when in a top view.

A front mount device 20, a rear mount device 30, and a left mount device 40 are respectively firmly mounted to the subframe 10 through a bolt member 50. Moreover, the engine 1 is supported through the front mount device 20, the rear mount device 30, and the left mount device 40.

Thus, vibration at the side of the engine 1 is formed in a manner of being transferred to the side of the subframe 10 via the front mount device 20, the rear mount device 30, and the left mount device 40.

Figure 3:
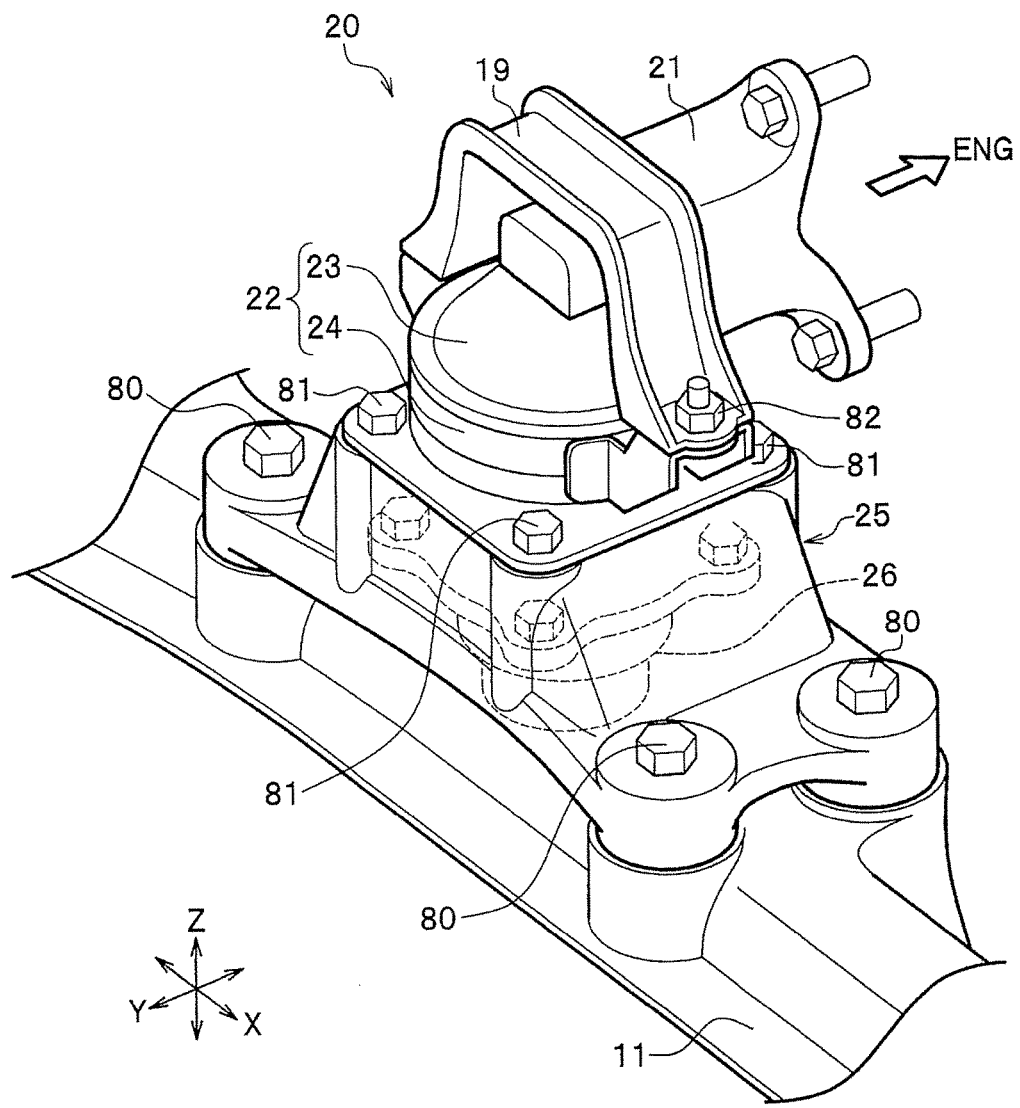
FIG. 3 is a partially enlarged three-dimensional diagram of the engine mount structure according to the embodiment of the present invention seen from an arrow III in FIG. 2.
Figure 4:
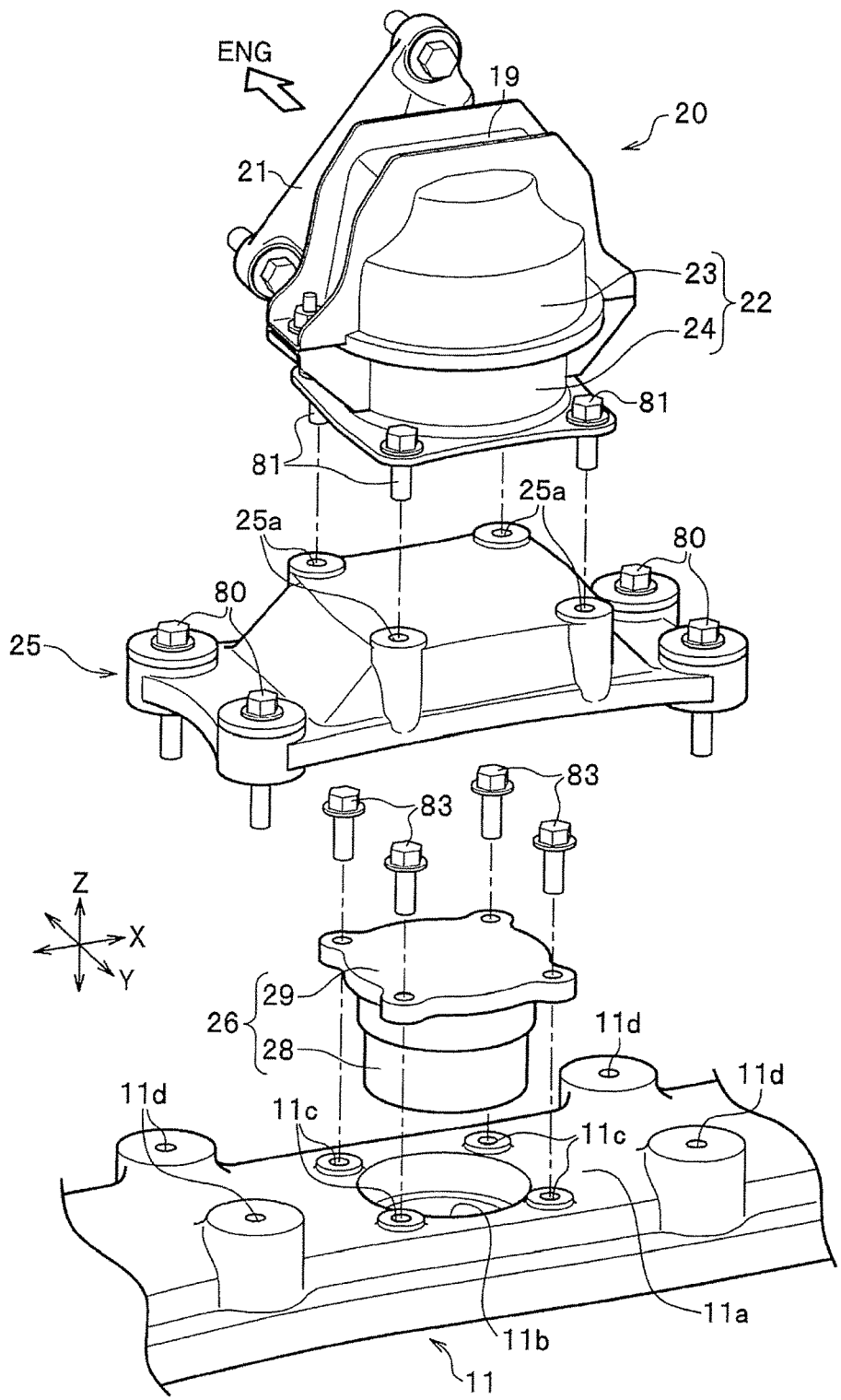
FIG. 4 is a partially exploded three-dimensional diagram of the engine mount structure according to the embodiment of the present invention seen from an arrow IV in FIG. 2.

FIG. 3 is a partially enlarged three-dimensional diagram of the engine mount structure according to the embodiment seen from an arrow III in FIG. 2. In addition, FIG. 4 is a partially exploded three-dimensional diagram of the engine mount structure according to the embodiment seen from an arrow IV in FIG. 2. Moreover, in FIG. 3 and FIG. 4, for ease of understanding, a part of a lower covering member 24 of an antivibration device 22 is omitted.

[Front Mount Device]

The front mount device 20 mainly includes: an engine mount bracket portion 21 that fixes the engine 1; an antivibration device 22 that suppresses vibration transferred from the engine 1 side to the subframe 10 side; a bell-shaped upper covering member 23 that covers the antivibration device 22; and a substantially cylindrical lower covering member 24. In addition, a top covering member 19 covering an upper end portion of the antivibration device 22 passes through a bolt member 82, and the bolt member 82 is mounted to the front mount device 20.

After vibration from the engine mount bracket portion 21 that supports the engine 1 is input to the antivibration device 22, the vibration is attenuated by using buffering of a buffer material such as a built-in liquid, so that the vibration may not be transferred to the subframe 10 side. Moreover, in the embodiment, the antivibration device internally provided with a liquid structure is described, but it not specifically limited thereto, and it may also be an antivibration device such as a buffer mount device as long as buffering is carried out.

The front mount device 20 of the embodiment further includes a dynamic damper 26 connected to the subframe 10 to suppress vibration of the subframe 10. The dynamic damper 26 is configured to a lower side of a leg member 25 of the front mount device 20.

The lower covering member 24 disposed at the front mount device 20 is fixed to an upper surface portion of the leg member 25 through multiple bolt members 81.

The dynamic damper 26 mainly includes: a receiving portion 28 as a housing, which receives a mass member 27; and a flange-like fixing portion 29, which supports the receiving portion 28 in a state of being suspended inside the front subframe member component 11.

In addition, a hole portion 11b is opened in an upper surface portion 11a of the front subframe member component 11. A bearing surface portion 11c is bulged beyond the periphery of the hole portion 11b.

Moreover, the fixing portion 29 is fixedly mounted to the bearing surface portion 11c through a bolt member (not shown) or through welding.

Figure 5:
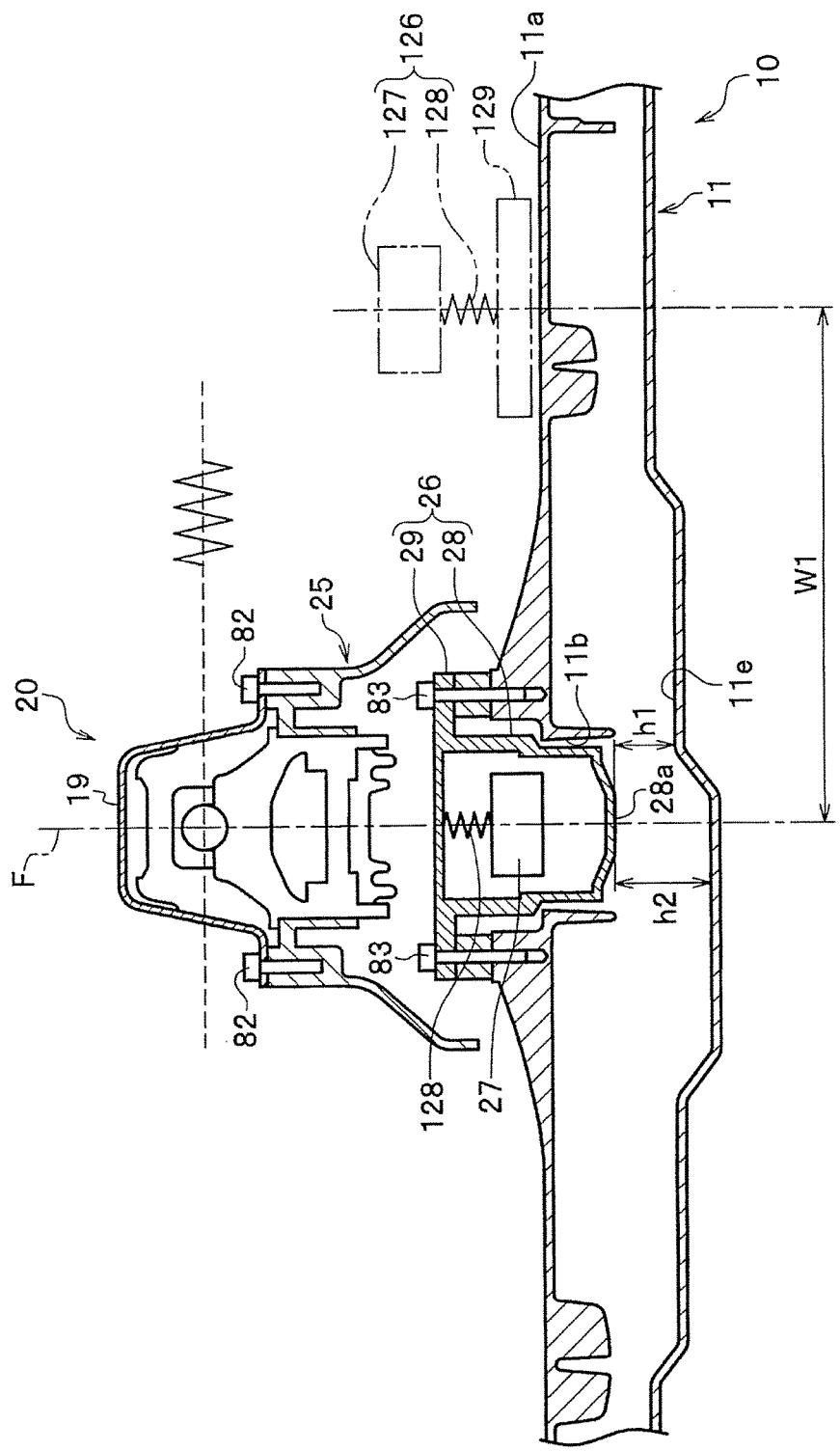
FIG. 5 is a sectional view of the engine mount structure according to the embodiment of the present invention along a position of a V-V line in FIG. 1.

FIG. 5 is a sectional view of the engine mount structure according to the embodiment along a position of a V-V line in FIG. 1.

In an A part indicated by double dot dash lines for comparison, a dynamic damper 126 is mounted to the upper surface portion 11a of the front subframe member component 11 via a installation bracket 129.

A mass member 127 of the dynamic damper 126 is supported by a spring member 128 having a prescribed elastic coefficient.

In an engine mount structure, relative to an input point F of vibration from the engine of the front mount device 20 through the center of a vehicle width direction, the dynamic damper is in a position of offsetting a dimension W1 towards a vehicle outer side in the vehicle width direction. Therefore, the vibration absorption efficiency is reduced. Moreover, engine vibration applied to the input point F of vibration has a frequency range of an area having about several ten Hz to 200 Hz.

In addition, the dynamic damper 126 is in a position deviating from a center position of the vehicle width direction of the front subframe member component 11 the same as the input point F of vibration. In this aspect, the belly of the vibration in the vehicle width direction of the front subframe member component 11 does not have the dynamic damper 126, as a result, the vibration absorption efficiency is further reduced.

Moreover, the dynamic damper 126 mounted to the upper surface portion 11a of the front subframe member component 11 may interfere with other auxiliary devices or peripherals.

Then, if the dynamic damper 26 is disposed in a position away from the engine, components on a vibration transmission path may be deteriorated through time, and thus it is possible to cause vibration absorption characteristics to change.

With respect to this, in the engine mount structure of the embodiment, the dynamic damper 26 is disposed on a lower side of the front mount device 20. Thus, the dynamic damper 26 can be located near an input point F of vibration of the engine in the front mount device 20. Therefore, the dynamic damper 26 has good vibration absorption efficiency.

Also, the dynamic damper 26 is disposed near the engine 1. Therefore, changes of the vibration absorption characteristics caused by through-time changes of the vibration transmission path can be reduced. Therefore, the control cost required when control is made corresponding to through-time changes can be reduced, and a stable vibration suppressing effect is produced.

In addition, the center of the vehicle width direction of the upper surface portion 11a of the front subframe member component 11 includes a hole portion 11b as the hole portion.

The front mount device 20 is connected to the front subframe member component 11 in a manner of being located on an upper side of the hole portion 11b.

In the embodiment, as shown in FIG. 4, the bolt members 81 are respectively screwed to a plurality of female thread portions 25a formed in the leg member 25, to connect the front mount device 20 to the leg member 25. Next, bolt members 80 are used to respectively screw and connect the leg member 25 to female thread portions 11d formed in the upper surface portion 11a of the front subframe member component 11.

At this point, the dynamic damper 26 is inserted from the hole portion 11b formed on the upper surface portion 11a to the front subframe member component 11 to be fixed. Thus, the dynamic damper 26 is connected to the front subframe member component 11, and absorbs vibration in a position where the amplitude of the center of the vehicle width direction of the front subframe member component 11 becomes large, which is equivalent to the belly.

According to the structure, as shown in FIG. 5, the dynamic damper 26 inserted to the hole portion 11b can be mounted in the following position: the position is identical with the input point F of vibration directly below the front mount device 20 in a vehicle width direction and a vehicle front-back direction.

Therefore, elastic deformation directions of the front mount device 20 and the dynamic damper 26 are identical in a vertical direction.

Therefore, engine vibration applied to a vertical direction of the front mount device 20 is efficiently absorbed by the dynamic damper 26.

Moreover, like a modular mechanical model of the dynamic damper 26 shown in FIG. 5, the mass member 27 disposed in the receiving portion 28 is, through the spring member 128, elastically moveably suspended to the fixing portion forming an upper wall. In the embodiment, after the vibration of the engine 1 is absorbed by the antivibration device 22, the vibration is transferred, via the leg member 25, to the upper surface portion 11a of the front subframe member component 11 fixed to the front mount device 20.

The dynamic damper 26 is inserted to the hole portion 11b formed by the opening in the upper surface portion 11a, and fixed to the periphery through a bolt member 83. Therefore, the dynamic damper 26 has better vibration absorption efficiency for engine vibration applied to a vertical direction of the front mount device 20.

In addition, as shown in FIG. 5, the hole portion 11b is disposed on the upper surface portion 11a of the front subframe member component 11, the fixing portion 29 of the dynamic damper 26 as the first installation member is connected to the upper surface portion, and the receiving portion 28 as the housing is inserted into the hole portion 11b.

Therefore, through welding or by using fastening of the bolt member 83, the fixing portion 29 of the dynamic damper 26 is connected to the upper surface portion of the subframe 10 through rigid combination (hereinafter also referred to as "rigid fix").

Thus, the dynamic damper 26 can efficiently absorb the vibration of the subframe 10.

In addition, as shown in FIG. 5, the front subframe member component 11 of the subframe 10 includes a lower surface portion 11e in a position opposite the upper surface portion 11a. In the embodiment, a bottom portion 28a of the receiving portion 28 of the dynamic damper 26 is spaced apart from the lower surface portion 11e by a prescribed dimension h1 to dimension h2.

Therefore, movement of the receiving portion 28 of the dynamic damper 26 for suppressing vibration may not be hindered, which can well maintain the attenuation performance.

Figure 6:
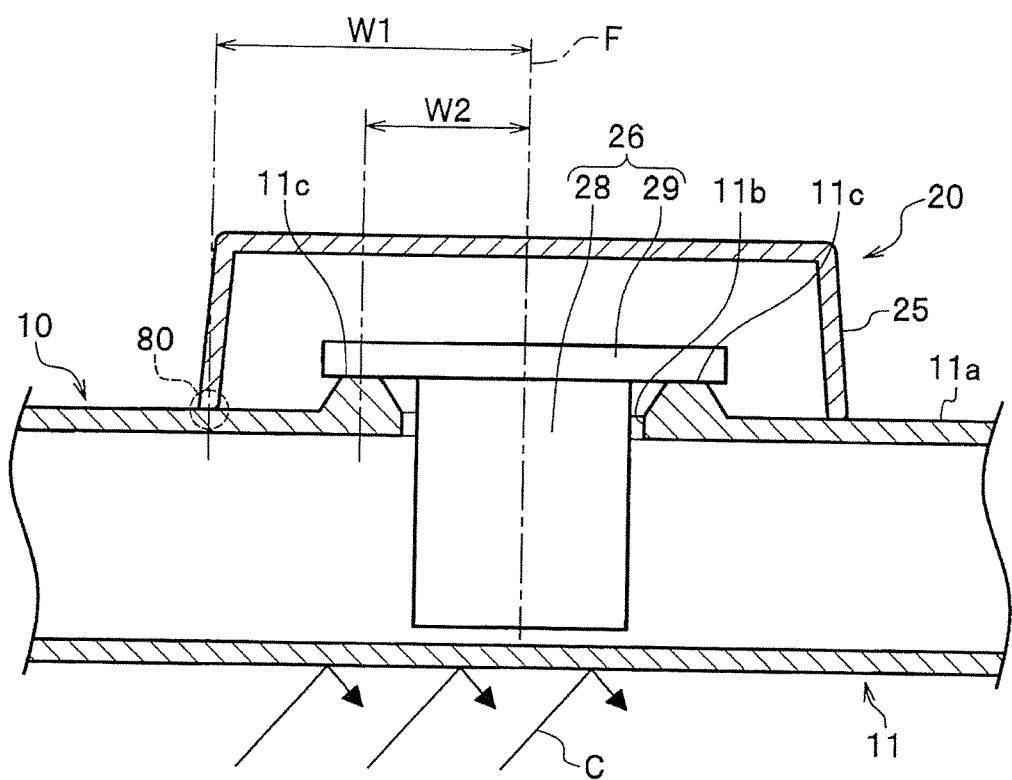
FIG. 6 is a modular sectional view of a situation where a dynamic damper in the engine mount structure according to the embodiment of the present invention is located in a subframe.

FIG. 6 is a modular sectional view of a situation where the dynamic damper 26 in the engine mount structure according to the embodiment of the present invention is located in the front subframe member component 11.

In the embodiment, the receiving portion 28 of the dynamic damper 26 is substantially embedded in a section of the front subframe member component 11.

Therefore, it can be easy to make the input point F of vibration directly below the front mount device 20 and an effect point of the maximum vibration absorption effect of the dynamic damper 26 consistent on a straight line of a vehicle top-bottom direction.

Besides, an effect point of the maximum vibration absorption effect of the center of the vehicle width direction, that is, a part in the vehicle width direction of the front subframe member component 11 which becomes the belly of the vibration can be consistent with the input point F of vibration from the engine of the front mount device 20 which passes through the center of the vehicle width direction.

Therefore, the vibration absorption efficiency can be good.

Moreover, the dynamic damper 26 is embedded inside the front subframe member component 11, and thus there is no need to worry about interfering with other auxiliary devices or peripherals in the engine room. Thus, the engine room can be well utilized to improve the design freedom of other devices or auxiliary devices.

Then, the dynamic damper 26 is located in the front subframe member component 11.

Therefore, for broken stone C bounced during driving of a vehicle, the dynamic damper 26 can also be protected through the front subframe member component 11.

Moreover, if the dynamic damper 126 is disposed in a position away from the engine 1, components on the vibration transmission path may be deteriorated through time, thus causing the vibration absorption characteristics to change (refer to FIG. 5).

With respect to this, in the engine mount structure of the embodiment, the dynamic damper 26 is located inside the front subframe member component 11 directly below the front mount device 20 input from vibration of the engine mount bracket portion 21.

Therefore, the vibration transmission path from the engine 1 to the dynamic damper 26 is short, which is not prone to influences of through-time deterioration of the components.

Besides, the leg member 25 is formed to be substantially umbrella-shaped, and the front mount device 20 is fixed to the upper surface portion 11a of the front subframe member component 11 through a bolt member 80.

Accordingly, the leg member 25 substantially umbrella-shaped is mounted in a manner covering an upper surface side of the dynamic damper 26.

In FIG. 6, for ease of description, the connecting portion of the bolt member 80 is omitted.

In addition, a connecting position (the position of the bolt member 80) between the front subframe member component 11 of the subframe 10 and the leg member 25 of the front mount device 20 is set in a position farther away from the dynamic damper than a connecting position (the position of the bearing surface portion 11c) between the front subframe member component 11 of the subframe 10 and the fixing portion 29 of the dynamic damper 26.

That is, the dimension W1 from the center position F1 of the vehicle width direction of the dynamic damper 26 to the bolt member 80 is greater than the dimension W2 from the center position F1 of the vehicle width direction of the dynamic damper 26 to the bearing surface portion 11c of the dynamic damper 26 (W1>W2).

Therefore, vibration can be well spread through the leg member 25 and the front subframe member component 11 of the subframe 10.

[Rear Mount Device]

Figure 7:
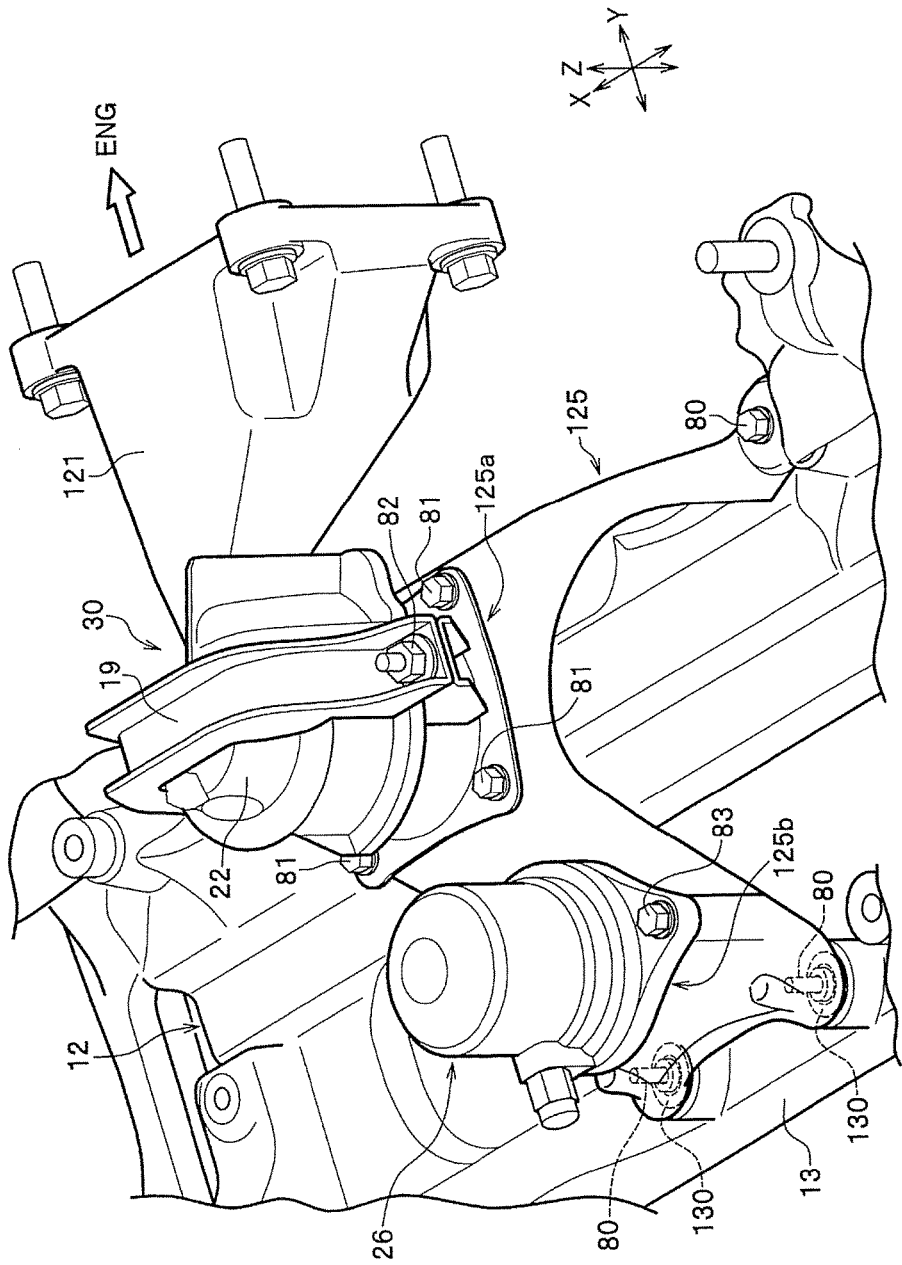
FIG. 7 is a partially enlarged three-dimensional diagram of the engine mount structure according to the embodiment seen from an arrow VII in FIG. 2.
Figure 8:
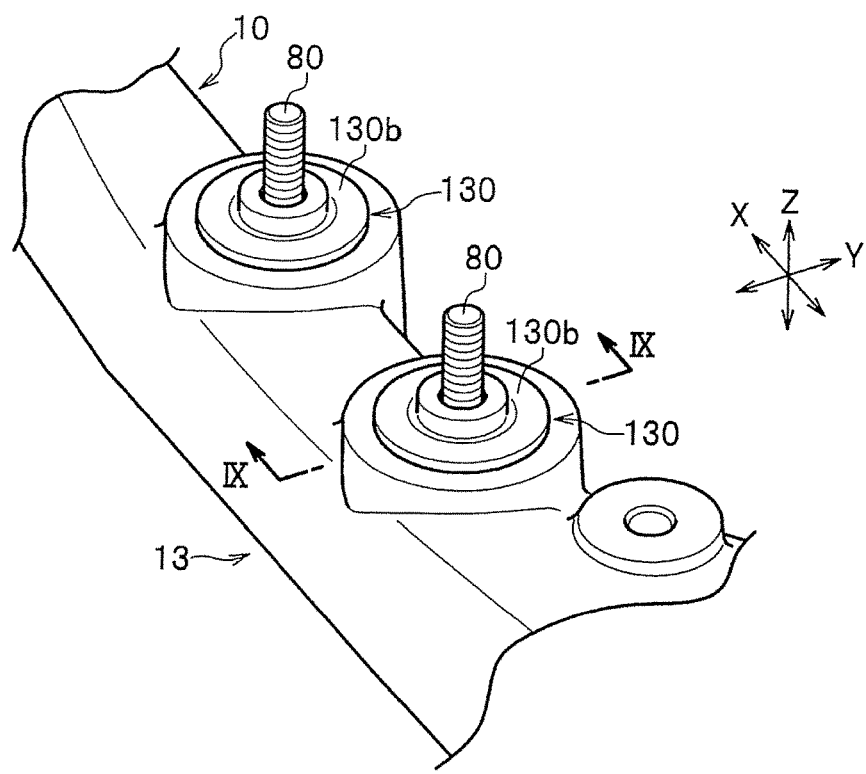
FIG. 8 is a three-dimensional diagram of a mount portion after an antivibration member is removed from the engine mount structure according to the embodiment in a direction of an arrow VIII in FIG. 7.
Figure 9:
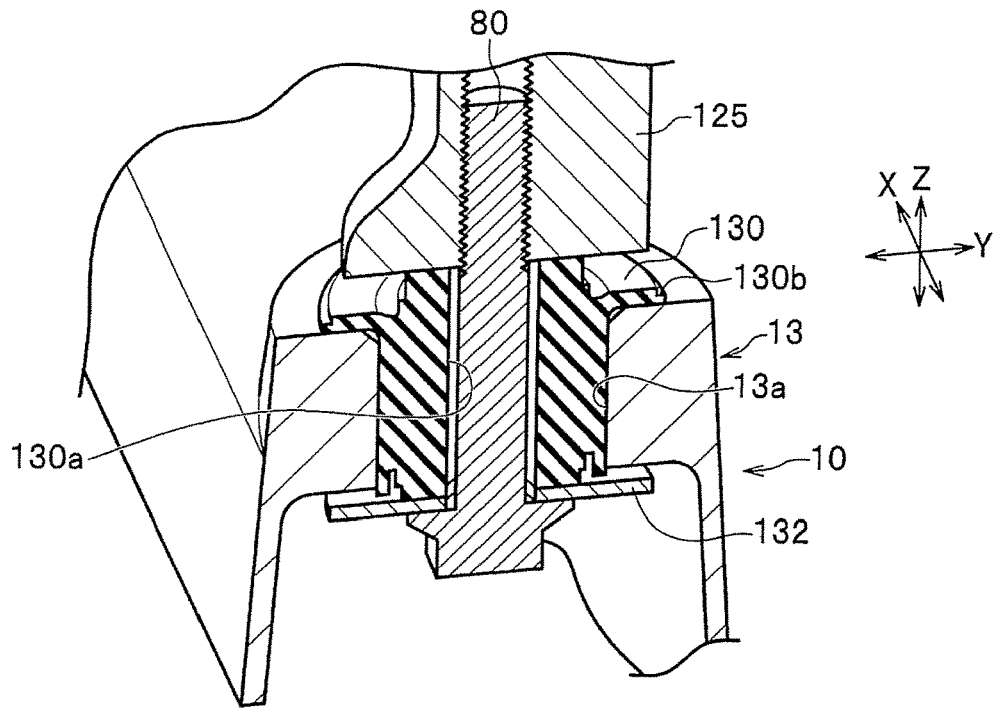
FIG. 9 is a sectional view of the engine mount structure according to the embodiment along a position of a line IX-IX in FIG. 8.

FIG. 7 illustrates a rear mount device of the embodiment, and is a partially enlarged three-dimensional view seen from an arrow VII in FIG. 2, FIG. 8 is a three-dimensional view of a mount portion after an antivibration member is removed in a direction of an arrow VIII in FIG. 7, and FIG. 9 is a sectional view along a position of an IX-IX line in FIG. 8.

Moreover, the same symbol is attached to the same or equivalent part as the front mount device 20 and description thereof is omitted. The rear mount device 30 in the embodiment, by using multiple bolt members 81, is fixed to a bearing surface portion 125a formed in a higher waist position in an arched leg member 125. Moreover, the engine 1 is supported via an engine mount bracket portion 121 (not shown).

The leg member 125 is formed in a manner of being erected between the rear first member component 12 and the rear second member component 13. The bolt members 80 are respectively inserted to a lower end portion screwed after and behind the leg member 25, to fix the leg member 125 in a manner of crossing the rear first member component 12 and the rear second member component 13.

A bearing surface portion 125b of the dynamic damper 26 is formed at a position of the arched leg member 125 closer to the rear of the vehicle than the bearing surface portion 125a. The bearing surface portion 125b is formed in a position lower than the bearing surface portion 125a. Besides, the mass member 27 is mounted to the bearing surface portion 125b by using a bolt member 83.

Moreover, the mass member 27 on a lower side of the rear mount device 30 offsets a fixed dimension in the vehicle front-back direction, and is configured through arrangement on a straight line L (refer to FIG. 1).

Besides, as shown in FIG. 1, a left mount device 40 is mounted on a subframe member component 14 on the left of the vehicle. The left mount device 40 is formed in a manner of supporting the engine 1 via the engine mount bracket portion 221.

Moreover, the leg member 25, the leg member 125, and the leg member 41 of the left mount device 40 are elastically connected to the subframe 10 via a rubber bush 130 as shown in FIG. 8 and FIG. 9.

For example, FIG. 8 and FIG. 9 illustrate a rear second member component 13 provided with a rear mount device 30.

A mounting hole 13a is formed in an opening of an upper surface portion of the rear second member component 13.

The rubber bush 130 clips an upper flange portion 130b to the periphery of the opening to be respectively embedded into the mounting hole 13a.

A bolt insertion-through hole 130a is formed through the rubber bush 130. Moreover, a bolt member 80 is inserted through the bolt insertion-through hole 130a from bottom to top, and a front end portion is disposed in a manner of protruding from an upper surface side of the subframe 10 towards the upper side of the vehicle.

As shown in FIG. 5 and FIG. 6, the subframe 10 of the embodiment and the leg member 25 of the front mount device 20 are elastically connected via the rubber bush 130. On the other hand, the subframe 10 and the dynamic damper 26 are fastened through welding or the bolt member 83, and are rigid fixed.

Therefore, vibration input from the engine 1 applied to the front mount device 20 is absorbed by the rubber bush 130, and vibration of the subframe 10 may be directly transferred to the dynamic damper 26. Therefore, the engine mount structure of the embodiment can further improve the attenuate efficiency of the vibration.

The present invention is not limited to the embodiment, and various transformations can be made. The embodiment is an embodiment illustrated to facilitate understanding of the present invention, is not limited to including all the described structures. Besides, a part of the structure of an embodiment may be replaced with the structure of another embodiment, and the structure of another embodiment may also be added to the structure of an embodiment. In addition, a part of the structure of each embodiment may be deleted, added or replaced with another structure. Possible transformations of the embodiment may be as follows.

In the engine mount structure of the embodiment, description is given by taking the front mount device 20 disposed at the front subframe member component 11 as a mount device, which is not specifically limited thereto, and it is also possible to dispose the dynamic damper 26 connected to the subframe 10 to suppress vibration of the subframe 10 on a lower side of the rear mount device 30 or the left mount device 40.

Also, it is indicated that that the front mount device 20 uses a liquid buffer material as the antivibration device 22, which is not specifically limited thereto, and as long as vibration transferred from the engine 1 side to the subframe 10 side is suppressed, any structure can be used to suppress vibration, for example, a rubber material is used as a solid buffer material.

Moreover, the opening of the hole portion 11b to which the dynamic damper 26 is inserted is formed in the upper surface portion 11b of the subframe 10, which is not specifically limited thereto. For example, it is also possible to insert the dynamic damper 26 from a hole portion formed in an opening of a front side, rear side or a lower surface portion, and dispose the dynamic damper 26 on a lower side of the mount device, but the shapes, numbers and arrangement positions of the mount device and the dynamic damper are not limited.

What is claimed is:

1. An engine mount structure, comprising a mount device, the mount device being connected to an engine and a subframe to suppress vibration transmission from the engine side to the subframe side, wherein
   a dynamic damper connected to the subframe to suppress vibration of the subframe is disposed on a lower side of the mount device,
   the subframe comprises a hole portion, the mount device is connected to the subframe in a manner of being located on an upper side of the hole portion, and the dynamic damper is inserted to the hole portion, and a connecting position between the subframe and the mount device is set in a position around the hole portion.

2. The engine mount structure according to claim 1, wherein the hole portion is disposed on an upper surface portion of the subframe, the dynamic damper comprises a first installation member and a housing, the first installation member is connected to the upper surface portion, and the housing is inserted to the hole portion.

3. The engine mount structure according to claim 2, wherein the subframe comprises a lower surface portion in a position opposite the upper surface portion, and the housing is spaced apart from the lower surface portion.

4. The engine mount structure according to claim 1, wherein the connecting position between the subframe and the mount device is set in a position farther away from the dynamic damper than a connecting position between the subframe and the dynamic damper.

5. The engine mount structure according to claim 1, wherein the subframe and the mount device are elastically connected via a rubber bush, and the subframe and the dynamic damper are fastened rigidly.

6. The engine mount structure according to claim 1, wherein elastic deformation directions of the mount device and the dynamic damper are identical in a vertical direction.

* * * * *